US009432420B2

(12) United States Patent
Nishida

(10) Patent No.: US 9,432,420 B2
(45) Date of Patent: Aug. 30, 2016

(54) COMMUNICATION SYSTEM, NON-TRANSITORY COMPUTER-READABLE MEDIUM STORING COMMUNICATION PROGRAM AND COMMUNICATION DEVICE

(71) Applicant: Makoto Nishida, Nagoya (JP)

(72) Inventor: Makoto Nishida, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 307 days.

(21) Appl. No.: 14/141,669

(22) Filed: Dec. 27, 2013

(65) Prior Publication Data
US 2014/0189012 A1 Jul. 3, 2014

(30) Foreign Application Priority Data
Dec. 27, 2012 (JP) ................................. 2012-284965

(51) Int. Cl.
*H04L 29/06* (2006.01)

(52) U.S. Cl.
CPC ............. *H04L 65/403* (2013.01); *H04L 29/06* (2013.01); *H04L 65/1073* (2013.01)

(58) Field of Classification Search
CPC . H04L 65/403; H04L 65/1073; H04L 29/06; H04L 29/08072; H04L 29/06027; H04L 12/581; G06Q 10/10
USPC .................... 709/204, 206; 370/260
See application file for complete search history.

(56) References Cited

U.S. PATENT DOCUMENTS

| 7,508,413 B2 | 3/2009 | Nose |
| 8,255,893 B2 | 8/2012 | Savva |
| 2003/0093563 A1* | 5/2003 | Young ................. H04L 12/4633 709/245 |
| 2004/0057435 A1* | 3/2004 | Ruyle ................. H04L 12/6418 370/395.5 |
| 2005/0243810 A1 | 11/2005 | Nose |
| 2008/0059953 A1 | 3/2008 | Savva |
| 2012/0127262 A1* | 5/2012 | Wu ....................... H04N 7/152 348/14.09 |
| 2013/0091273 A1* | 4/2013 | Ly ........................... H04L 41/00 709/224 |

FOREIGN PATENT DOCUMENTS

| JP | 2005-318463 A | 11/2005 |
| JP | 2008-065409 A | 3/2008 |

\* cited by examiner

*Primary Examiner* — Oleg Survillo
*Assistant Examiner* — Mehulkumar Shah
(74) *Attorney, Agent, or Firm* — Banner & Witcoff, Ltd.

(57) ABSTRACT

A communication system includes a first communication device and a second communication device connecting to a LAN. Using a first proxy setting for a specific proxy server, the first communication device communicates with a conference server via a proxy server to establish a session. If the session has not been established, the first communication device determines whether LAN information identifying the LAN is included in history information stored in the first communication device. If the LAN information is includes in the history information, the first communication device transmits setting request data to the second communication device identified by device information associated with the LAN information. If the second processor receives the setting request data, the second processor transmits the second proxy setting to the first communication device. The first communication device communicates with the conference server to establish a session using the received second proxy setting.

8 Claims, 7 Drawing Sheets

FIG. 3

| DEVICE ID | IP ADDRESS | NW ADDRESS | NUMBER OF CONFERENCES |
|---|---|---|---|
| 15 | 192.168.10.1 | 255.255.255.0 | 10 |
| ... | ... | ... | ... |

242

COMMUNICATION SYSTEM, NON-TRANSITORY COMPUTER-READABLE MEDIUM STORING COMMUNICATION PROGRAM AND COMMUNICATION DEVICE

CROSS-REFERENCE TO RELATED APPLICATION

This Application claims priority from JP2012-284965, filed on Dec. 27, 2012, the content of which is hereby incorporated by reference.

BACKGROUND

The present disclosure relates to a communication system that is used to hold a remote conference, a non-transitory computer-readable medium storing a communication program for communication that is performed by a communication device to hold a remote conference, and a communication device.

A communication device that connects to a local area network (LAN) that is provided with a proxy server performs communication with a remote conference server that is connected to a network outside the LAN, via the proxy server, based on information set in relation to the proxy server (hereinafter referred to as "proxy setting"). Thus, the communication device is able to hold a remote conference with another communication device that connects to another LAN, via the remote conference server.

However, there are cases in which the proxy setting of a communication device for a certain LAN is not appropriate when the communication device connects to another LAN. For example, let us consider a LAN environment in which the proxy setting of the communication device is not set by automatic detection and it is necessary to directly specify an address and a port of the proxy server as the proxy setting. In this type of LAN environment, when the communication device connected to the certain LAN is moved and connected to another LAN, the moved communication device cannot detect a proxy server of the other LAN. Therefore, the moved communication device cannot perform communication with a remote conference server via the proxy server. In order to solve this problem, a technology is disclosed in which a server simultaneously changes settings of a plurality of computers.

SUMMARY

However, when the above-described technology is applied, if the proxy setting is not changed in one of the communication devices, setting change processing is not performed by the server. Therefore, when the communication device connected to a certain LAN is moved and connected to another LAN, the proxy setting of a communication device that is continuously connected to the other LAN is not changed. Therefore, the setting change processing is not performed by the server and the proxy setting of the moved communication device is not changed. Thus, the moved communication device cannot perform communication with the remote conference server via the proxy server.

The present disclosure provides a communication system including communication devices connected to a LAN, a non-transitory computer-readable medium storing a communication program that is used by a communication device connected to a LAN to appropriately perform communication via a proxy server provided in the LAN, and a communication device.

An aspect of the present disclosure provides a communication system includes a first communication device configured to connect to a local area network (LAN), and a second communication device configured to connect to the LAN. The first communication device includes a first processor and a first memory. The first memory stores computer-readable instructions. The instructions, when executed by the first processor, perform processes. The processes include a first communicating operation, a first determining operation, a second determining operation, a first transmitting operation, and a second communication operation. The first communicating operation communicates from inside the LAN with a conference server via a proxy server to establish a session for a remote conference between the first communication device and the conference server using a first proxy setting, the conference server is provided outside the LAN, the proxy server is provided inside the LAN, the first proxy setting is stored in a storage device of the first communication device and being a setting to communicate via a specific proxy server. The first determining operation determines whether the session has been established using the first proxy setting by the first communicating operation. The second determining operation determines, in response to the determination by the first determining operation that the session has not been established, whether LAN information identifying the LAN is included in history information stored in the storage device, the history information is information in which device information identifying another communication device with which a remote conference was held and a specific LAN information identifying a specific LAN to which the other communication device is connected are associated with each other. The first transmitting operation transmits, in response to the determination by the second determining operation that the LAN information identifying the LAN is included in the history information, setting request data to the second communication device identified by device information associated with the LAN information in the history information, the setting request data is data to request a second proxy setting and being data that includes at least first device information identifying the first communication device, the second proxy setting is a setting to communicate with the conference server from inside the LAN via the proxy server. The second communication operation communicates, in response to receiving of the second proxy setting from the second communication device, with the conference server to establish a session with the conference server using the received second proxy setting. The second communication device includes a second processor and a second memory. The second memory stores computer-readable instructions. The instructions, when executed by the second processor, perform processes. The processes include a third determining operation and a second transmitting operation. The third determining operation determines, in response to receiving of the setting request data from the first communication device, whether to transmit the second proxy setting stored in a storage device of the second communication device to the first communication device, based on the first device information included in the setting request data. The second transmitting operation transmits, in response to the determination by the third determining operation that the second proxy setting is to be transmitted to the other communication device, the second proxy setting to the first communication device.

Another aspect of the present disclosure provides a non-transitory computer-readable medium storing computer readable instructions, the instructions, when executed by a processor of a communication device, perform processes. The processes include a first communicating operation, a first determining operation, a second determining operation, a first transmitting operation, and a second communication operation. The first communicating operation communicates from inside a local area network (LAN) with a conference server via a proxy server to establish a session for a remote conference between the communication device and the conference server using a first proxy setting, the conference server being provided outside the LAN, the proxy server being provided inside the LAN, the first proxy setting being stored in a storage device of the communication device and being a setting to communicate via a specific proxy server. The second determining operation determines, in response to the determination by the first determining operation that the session has not been established, whether LAN information identifying the LAN is included in history information stored in the storage device, the history information being information in which device information identifying another communication device with which a remote conference was held and a specific LAN information identifying a specific LAN to which the other communication device is connected are associated with each other. The first transmitting operation transmits, in response to the determination by the second determining operation that the LAN information identifying the LAN is included in the history information, setting request data to a specific communication device identified by device information associated with the LAN information in the history information, the setting request data being data to request a second proxy setting and being data that includes at least device information identifying the communication device, the second proxy setting being a setting to communicate with the conference server from inside the LAN via the proxy server. The second communication operation communicates, in response to receiving of the second proxy setting from the specific communication device, with the conference server to establish a session for a remote conference between the communication device and the conference server using the received second proxy setting.

Yet another aspect of the present disclosure provides a communication device that includes a processor and a memory. The memory stores computer-readable instructions. The instructions, when executed by the processor, perform processes. The processes include a first communicating operation, a first determining operation, a second determining operation, a first transmitting operation, and a second communication operation. The first communicating operation communicates from inside a local area network (LAN) with a conference server via a proxy server to establish a session for a remote conference between the communication device and the conference server using a first proxy setting, the conference server being provided outside the LAN, the proxy server being provided inside the LAN, the first proxy setting being stored in a storage device of the communication device and being a setting to communicate via a specific proxy server. The second determining operation determines, in response to the determination by the first determining operation that the session has not been established, whether LAN information identifying the LAN is included in history information stored in the storage device, the history information being information in which device information identifying another communication device with which a remote conference was held and a specific LAN information identifying a specific LAN to which the other communication device is connected are associated with each other. The first transmitting operation transmits, in response to the determination by the second determining operation that the LAN information identifying the LAN is included in the history information, setting request data to a specific communication device identified by device information associated with the LAN information in the history information, the setting request data being data to request a second proxy setting and being data that includes at least device information identifying the communication device, the second proxy setting being a setting to communicate with the conference server from inside the LAN via the proxy server. The second communication operation communicates, in response to receiving of the second proxy setting from the specific communication device, with the conference server to establish a session for a remote conference between the communication device and the conference server using the received second proxy setting.

BRIEF DESCRIPTION OF THE DRAWINGS

Embodiments of the disclosure will be described below in detail with reference to the accompanying drawings in which:

FIG. 3 is a diagram illustrating a history information table 242;

DETAILED DESCRIPTION

Figure 1:
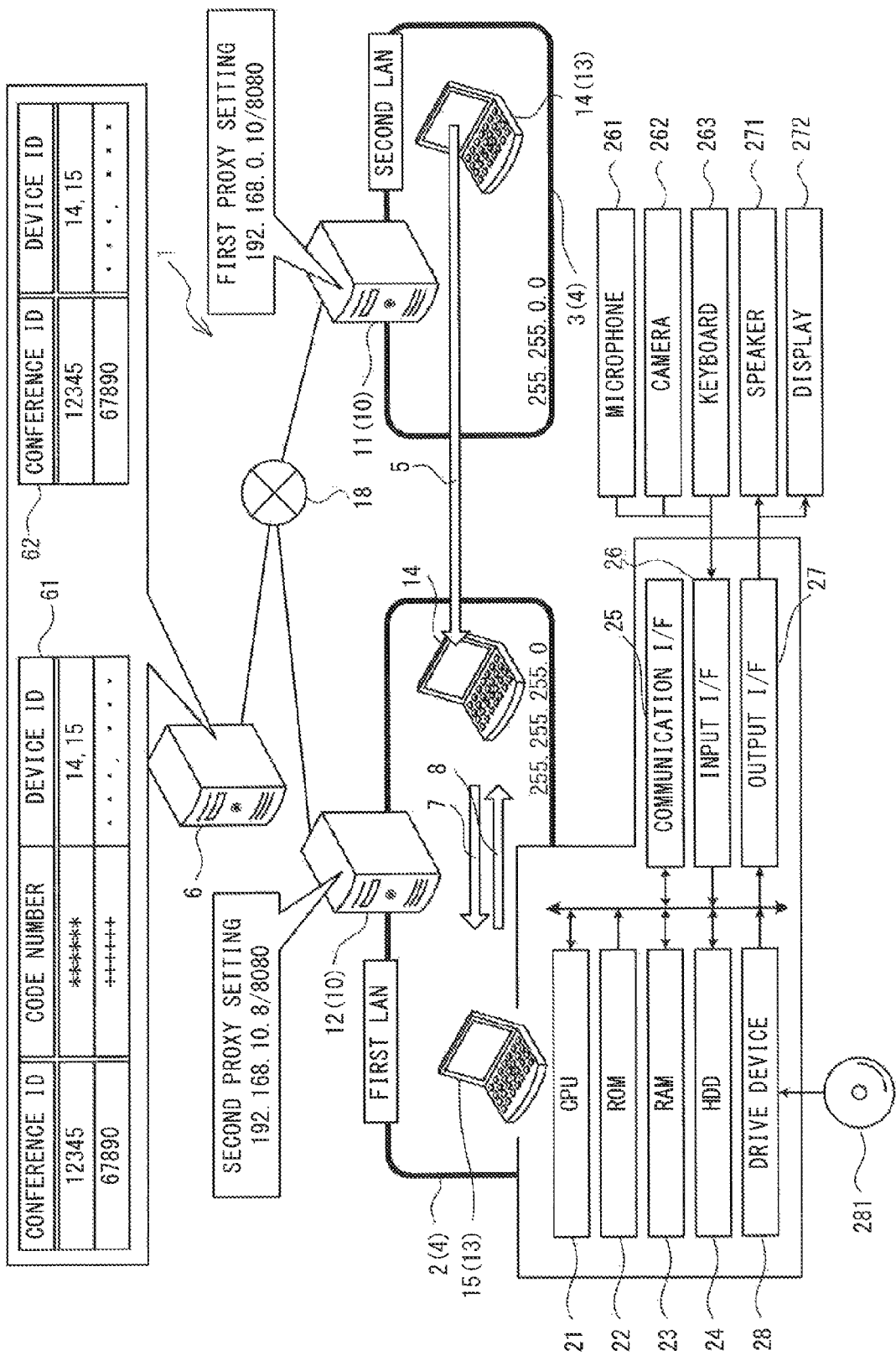
FIG. 1 is a diagram illustrating an overview of a communication system 1 and an electrical configuration of a communication device 13.

An embodiment of the present disclosure will be explained with reference to the drawings. A communication system 1 will be explained with reference to FIG. 1. The communication system 1 is provided with a conference server 6, proxy servers 11 and 12 (hereinafter also collectively referred to as "proxy server(s) 10") and communication devices 14 and 15 (hereinafter also collectively referred to as "communication device(s) 13"). A known multi-point control unit (MCU) is a specific example of the conference server 6. A known personal computer (PC) is a specific example of the communication device 13. The conference server 6 is connected to an Internet 18. The proxy server 12 is provided inside a first local area network (LAN) 2. The communication device 15 that is connected to the first LAN 2 can perform communication with the conference server 6 via the proxy server 12. The proxy server 11 is provided inside a second LAN 3. The communication device 14 that is connected to the second LAN 3 can perform communication with the conference server 6 via the proxy server 11. The network address "255.255.255.0" is assigned to the first LAN 2, and the network address "255.255.0.0" is assigned to the second LAN 3. Hereinafter, the first LAN 2 and the second LAN 3 are also collectively referred to as a "LAN 4". Further, each of the communication devices 14 and 15 is assigned identification information (hereinafter also referred to as a "device ID") that is the same as the reference number of each of the communication devices 14 and 15. Note that the number of the communication devices 13 that are connected to the LAN 4 is not limited to the example shown in FIG. 1. Further, a plurality of LANs that are different from the first LAN 2 and the second LAN 3 may be connected to the Internet 18. Further, a dedicated communication line may be used instead of the Internet 18.

The communication system 1 is a remote conference system that allow a remote conference to be held between users of the communication devices 13 by transmitting and receiving video and audio between two or more of the communication devices 13 via the conference server 6. When the users of the communication devices 13 participate in the remote conference, each of the users inputs a conference ID and a code number to the communication device 13 via a keyboard 263. The conference ID is unique identification information that is specified for each remote conference. The conference ID is necessary to newly start a remote conference or to participate in the remote conference that has already been started. For example, a number of given digits is used as the conference ID. The conference ID may be a URL that identifies a unique resource of the conference server 6. That is, the CPU (not shown in the drawings) of the conference server 6 may generate a resource that is different for each of remote conferences so that each remote conference can be identified. The CPU 21 of the communication devices 13 may access to an URL that indicates the resource received from the conference server 6. The code number is a password that is necessary to participate in a remote conference, and is assigned in advance to each remote conference that is identified by the conference ID. When the conference ID and the code number are input, a CPU 21 of the communication device 13 transmits the conference ID and the code number to the conference server 6, and thus the remote conference is started.

Note that the conference ID and the code number are determined in advance by a CPU (not shown in the drawings) of the conference server 6. The CPU of the conference server 6 associates the determined conference ID and code number, and stores the associated conference ID and code number in a registration table 61 that is stored in an HDD (not shown in the drawings). When each of the users of the plurality of communication devices 13 takes part in the remote conference, the CPU of the conference server 6 notifies each of the users of the determined conference ID and code number. For example, the notification of the conference ID and the code number is performed by the CPU of the conference server 6 distributing e-mail, in which the conference ID and the code number are described, to each of the communication devices 13. Note that the communication devices 13 to which the conference ID and the code number are notified are set in advance for each conference ID by the communication device 13 of an organizer who sets up the remote conference.

When the conference ID and the code number are received from the communication device 13, the CPU of the conference server 6 refers to the registration table 61 and thereby determines whether to allow the communication device 13 to participate in the remote conference that is identified by the conference ID. When the CPU of the conference server 6 allows the communication device 13 to participate in the remote conference, the CPU of the conference server 6 associates the conference ID with the device ID of the communication device 13 that is allowed to participate in the remote conference, and stores the associated conference ID and device ID in a conference table 62 that is stored in the HDD. Note that, the CPU of the conference server 6 may associate the conference ID with a user ID in addition to the device ID and store in the conference table 62. In this case, the CPU 21 of the communication device 13 transmits the user ID in addition to the conference ID and the code number to the conference server 6. By doing this, the user of the communication device 13 that is allowed to participate in the remote conference is able to participate in the remote conference identified by the conference ID and to have a conversation with the user of the other communication device 13. Note that, in the following embodiment, various tables that is identified by the device ID are stored (refer to FIG. 2 and FIG. 3). In a case where, the user ID is transmitted from the communication device 13 to the conference server 6, the various tables that is identified by the user ID may be stored.

Note that a series of communication that is performed between the conference server 6 and the communication device 13 in order to hold a remote conference is hereinafter referred to as a "session." A situation in which a session becomes possible between the conference server 6 and the communication device 13 is referred to as "the session is established." After the session with the conference server 6 is established, the communication device 13 holds the remote conference by performing mutual communication with the other communication device 13.

Note that the communication device 13 may hold the remote conference by directly performing mutual communication with the other communication device 13 without going through the conference server 6. The remote conference may be a call system in which a conversation is made between the users of the communication devices 13 by transmitting and receiving audio only between the communication devices 13.

An electrical configuration of the communication device 13 will be explained. The communication device 13 is provided with the CPU 21 that performs overall control of the communication device 13. The CPU 21 is electrically connected to a ROM 22, a RAM 23, a hard disk drive (HDD) 24, a communication interface (I/F) 25, an input I/F 26, an output I/F 27 and a drive device 28. A boot program, a basic input output system (BIOS) and the like are stored in the ROM 22. A timer, a counter and temporary data are stored in the RAM 23. Further, the conference ID of the remote conference that is currently being held is stored in the RAM 23. Programs that cause the CPU 21 to execute main processing (to be described later, refer to FIG. 4) and response processing (refer to FIG. 6 and FIG. 7) are stored in the HDD 24. Further, a device information table 241 (to be described later, refer to FIG. 2) and a history information table 242 (to be described later, refer to FIG. 3) are stored in the HDD 24. Further, setting information (hereinafter referred to as "proxy setting") to perform communication with a proxy server 10 that is provided inside the LAN 4 to which the communication device 13 is connected is stored in the HDD 24. The proxy setting includes an IP address and a port number of the proxy server 10.

The communication I/F 25 is an interface to connect the communication device 13 to the LAN 4. The input I/F 26 is an interface to connect a microphone 261, a camera 262 and the keyboard 263 to the communication device 13. The output I/F 27 is an interface to connect a speaker 271 and a display 272 to the communication device 13. The drive device 28 reads information stored in a storage medium 281. For example, when the communication device 13 is set up, a program stored in the storage medium 281 is read by the drive device 28 and is stored in the HDD 24. Note that the CPU 21 of the communication device 13 may receive the program via the Internet 18 and may store the program in the HDD 24. In this case, the program is stored in a storage medium, such as an HDD, that is provided in a server (not shown in the drawings) that is connected via the Internet 18.

When the communication device 13 that connects to the LAN 4 in which the proxy server 10 is provided performs communication with the conference server 6 that connects to the Internet 18, the communication device 13 performs communication using, as a destination, the IP address and the port number that are included in the proxy setting stored in the HDD 24. Hereinafter, performing communication with the proxy server 10 using the IP address and the port number included in the proxy setting as the destination is differently expressed as "performing communication with the proxy server 10 using the proxy setting." In place of the communication device 13, the proxy server 10 performs communication with the conference server 6. Thus, the communication device 13 is able to perform communication with the conference server 6 via the proxy server 10. On the other hand, when the proxy setting is not stored in the HDD 24 of the communication device 13 or when the proxy setting is wrong, the communication device 13 cannot perform communication with the proxy server 10 and therefore cannot perform communication with the conference server 6.

Therefore, normally, the proxy setting of the proxy server 10, which is provided inside the LAN 4 to which the communication device 13 is connected, is input to the communication device 13 by the user via the keyboard 263 or the like. For example, the proxy setting of the proxy server 12 (the IP address "192.168.10.8" and the port number "8080") is input to the communication device 15 that connects to the first LAN 2, and the proxy setting of the proxy server 11 (the IP address "192.168.0.10" and the port number "8080") is input to the communication device 14 that connects to the second LAN 3. The CPU 21 of each of the communication devices 14 and 15 stores the input proxy setting in the HDD 24. Thus, the communication devices 14 and 15 are able to perform communication with the proxy servers 11 and 12, respectively, using the proxy setting stored in the HDD 24. Therefore, the communication devices 14 and 15 are able to hold a remote conference with each other via the conference server 6, by respectively performing communication with the conference server 6 via the proxy servers 11 and 12.

Hereinafter, the proxy setting of the proxy server 11 is also referred to as a "first proxy setting" and the proxy setting of the proxy server 12 is also referred to as a "second proxy setting."

Note that there is a known technology in which the communication device 13 uses a web proxy auto discovery (WPAD) protocol and automatically acquires the proxy setting of the proxy server 10 from a server other than the proxy server 10 provided in the LAN to which the communication device 13 is connected. It is thus possible to perform communication with the proxy server 10 without requiring an input operation of the proxy setting. However, in the present disclosure, a situation is assumed in which the communication device 13 cannot automatically acquire the proxy setting of the proxy server 10. As this type of situation, a case is considered in which, for example, the communication device 13, for which the IP address and the port number of the proxy server 10 are directly specified as the proxy setting, connects to the LAN having the other proxy server 10. Further, a case is considered in which the communication device 13 that specifies auto detection (the use of the WPAD protocol) in the proxy setting is connected to the LAN that is not compatible with the WPAD protocol.

The device information table 241 (refer to FIG. 2) and the history information table 242 (refer to FIG. 3) that are stored in the HDD 24 of the communication device 13 will be explained. As an example, a case will be described in which remote conferences have been held a plurality of times in the past between the communication devices 14 and 15 by the communication device 15 performing communication with the conference sever 6 via the proxy server 12 and the communication device 14 performing communication with the conference server 6 via the proxy server 11. The device information table 241 and the history information table 242 that are stored in the HDD 24 of the communication device 14 will be specifically explained.

Note that it is assumed that the proxy setting to perform communication with the conference server 6 via the proxy server 11 or 12 has been input to each of the communication devices 14 and 15 in advance by the user. Specifically, it is assumed that the second proxy setting of the proxy server 12, which is provided inside the first LAN 2 to which the communication device 15 connects, is stored in the HDD 24 of the communication device 15, and the first proxy setting of the proxy server 11, which is provided inside the second LAN 3 to which the communication device 14 connects, is stored in the HDD 24 of the communication device 14.

Figure 2:
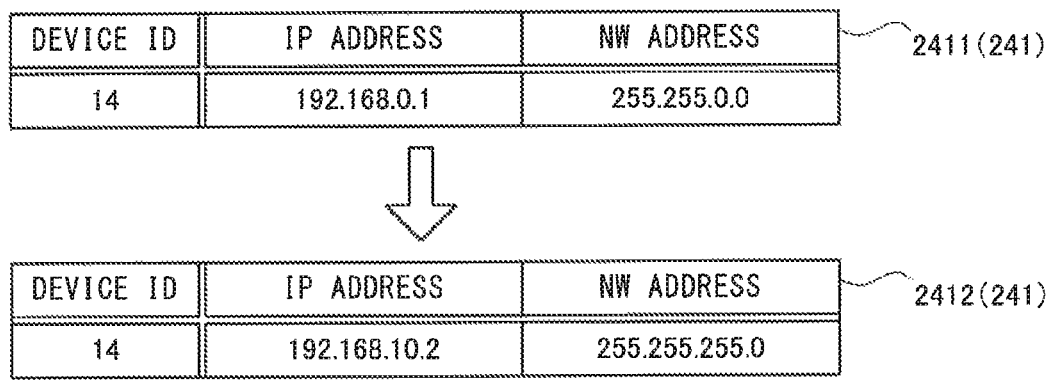
FIG. 2 is a diagram illustrating a device information table 241.

The device information table 241 will be explained with reference to FIG. 2. Note that a device information table 2411 indicates the device information table 241 before update, and a device information table 2412 indicates the updated device information table 241. The device ID, the IP address and the network address (hereinafter referred to as the "NW address") are associated with each other and stored in the device information table 241. The device ID of the device information table 241 is identification information that identifies the communication device 13 itself that stores the device information table 241 in the HDD 24. The IP address of the device information table 241 is a local IP address that is assigned to the communication device 13 in the LAN 4 to which the communication device 13 identified by the corresponding device ID connects. The NW address of the device information table 241 is a local network address that is assigned to the LAN 4 to which the communication device 13 identified by the corresponding device ID connects. As described above, the information relating to the communication device 13 itself is stored in the device information table 241.

The device ID that is stored in the device information table 241 is input by the user via the keyboard 263 or the like. The IP address and the NW address that are stored in the device information table 241 are automatically notified to the communication device 13 by a dynamic host configuration protocol (DHCP) server (not shown in the drawings) that is provided in the LAN 4. The CPU 21 of the communication device 13 acquires the IP address and the NW address notified by the DHCP server provided in the LAN 4, and stores the IP address and the NW address in the device information table 241. Note that the IP address and the NW address that are stored in the device information table 241 may be directly input by the user via the keyboard 263 or the like.

For example, in the case of the device information table 2411, the device ID "14" of the communication device 14 is stored, the IP address "192.168.0.1" that is assigned to the communication device 14 in the second LAN 3 to which the communication device 14 connects is stored, and the NW address "255.255.0.0" assigned to the second LAN 3 to which the communication device 14 connects is stored.

Although not shown in the drawings, in the device information table 241 that is stored in the HDD 24 of the communication device 15, the device ID "15" of the communication device 15 is stored, the IP address "192.168.10.1" that is assigned to the communication device 15 in the first LAN 2 to which the communication device 15 connects is stored, and the NW address "255.255.255.0" assigned to the first LAN 2 to which the communication device 15 connects is stored.

The history information table 242 will be explained with reference to FIG. 3. The device ID, the IP address, the NW address and the number of conferences are associated and stored in the history information table 242. The device ID of the other communication device 13 that has participated in the remote conference held in the past and the device ID of the other communication device 13 that is participating in the remote conference currently being held are stored as the device ID. The IP address is an IP address assigned to the communication device 13 that is identified by the corresponding device ID. The NW address is a network address assigned to the LAN 4 to which the communication device 13 identified by the corresponding device ID connects. The number of conferences is the number of remote conferences that have been held with the communication device 13 identified by the corresponding device ID. As described above, the information relating to the other communication device 13 in the remote conference held in the past and the remote conference currently being held is stored in the history information table 242.

In the case of FIG. 3, since the communication device 14 has held remote conferences with the communication device 15 in the past, the ID "15" of the communication device 15 is stored as the device ID. Note that, when the communication device 14 has held a remote conference with the communication device 13 other than the communication device 15, the device ID of the communication device 13 other than the communication device 15 is stored separately from the device ID "15". Further, when three or more of the communication devices 13 perform communication with each other and participate in the same remote conference, the device IDs of all the other communication devices 13 that participate in the remote conference are stored. The device ID "15" is stored in association with the IP address "192.168.10.1" assigned to the communication device 15 identified by the device ID "15", and with the NW address "255.255.255.0" assigned to the first LAN 2 to which the communication device 15 connects. Further, since "10" is stored as the number of conferences, the communication device 14 has held the remote conference with the communication device 15 ten times in the past.

Although not shown in the drawings, in the history information table 242 that is stored in the HDD 24 of the communication device 15, the device ID "14" of the communication device 14 is stored, the IP address "192.168.0.1" that is assigned to the communication device 14 in the second LAN 3 to which the communication device 14 connects is stored, and the NW address "255.255.0.0" assigned to the second LAN 3 to which the communication device 14 connects is stored.

It is assumed that the communication device 14 is moved and its state is changed from a state in which the communication device 14 is connected to the second LAN 3 to a state in which the communication device 14 is connected to the first LAN 2 (refer to an arrow 5 in FIG. 1). The CPU 21 of the communication device 14 stores the IP address "192.168.10.2" and the NW address "255.255.255.0", which are notified by the DHCP server (not shown in the drawings) provided inside the first LAN 2, in the device information table 2411 stored in the HDD 24 of the communication device 14, and thus updates the device information table 2411. The notified IP address "192.168.10.2" is an IP address that is assigned to the communication device 14 in the newly connected first LAN 2. The notified NW address "255.255.255.0" is a NW address assigned to the newly connected first LAN 2. As a result, the device information table 2411 (refer to FIG. 2) is updated to the device information table 2412 (refer to FIG. 2).

It is assumed that the communication device 14 starts communication with the conference server 6 in order to start a remote conference with the communication device 15. Since the first proxy setting is stored in the HDD 24 of the communication device 14, the CPU 21 of the communication device 14 attempts to perform communication with the proxy server 11 using the first proxy setting. However, since the proxy server 12 is provided in the first LAN 2 and the second proxy setting of the proxy server 12 is not stored in the HDD 24 of the communication device 14, the communication device 14 cannot perform communication with the proxy server 12. Therefore, the communication device 14 cannot establish a session by performing communication with the conference server 6, and cannot start the remote conference with the communication device 15.

To address this, the CPU 21 of the communication device 14 cannot perform communication with the conference server 6 using the first proxy setting stored in the HDD 24. When it is not possible to establish a session with the conference server 6, the CPU 21 of the communication device 14 acquires the second proxy setting in the following manner. First, the CPU 21 of the communication device 14 refers to the device information table 2412 (refer to FIG. 2) and the history information table 242 (refer to FIG. 3) that are stored in the HDD 24. Based on the device information table 2412 and the history information table 242, the CPU 21 of the communication device 14 identifies the communication device 15 with which a remote conference has been held in the past and which is connected to the first LAN 2 to which the communication device 14 is newly connected.

Specifically, the communication device 15 is identified in the following manner. The NW address "255.255.255.0" that is stored in the device information table 2412 is also stored in the history information table 242. Therefore, the CPU 21 of the communication device 14 identifies, from the history information table 242, the communication device 15 that is identified by the device ID "15" corresponding to the NW address "255.255.255.0".

Next, the CPU 21 of the communication device 14 requests the identified communication device 15 to set the second proxy setting of the proxy server 12 that is provided inside the first LAN 2 (an arrow 7). When predetermined conditions (details will be described later) are satisfied, the CPU 21 of the communication device 15 notifies the communication device 14 of the second proxy setting in response to the request (an arrow 8). The CPU 21 of the communication device 14 stores the second proxy setting notified by the communication device 15 in the HDD 24.

In order to establish a session with the conference server 6, the CPU 21 of the communication device 14 starts communication with the proxy server 12 using the second proxy setting stored in the HDD 24. The second proxy setting has already been used by the communication device 15 to perform communication with the proxy server 12. Therefore, the communication device 14 can perform communication with the proxy server 12 using the second proxy setting. Therefore, the communication device 14 is able to establish a session with the conference server 6 via the proxy server 12. If the communication device 15 has also established a session with the conference server 6, the communication device 14 is able to hold a remote conference with the communication device 15 via the conference server 6.

As described above, the CPU 21 of the communication device 14 can acquire the second proxy setting from the communication device 15. Therefore, the user of the communication device 14 need not input, to the communication device 14, the second proxy setting that has been acquired, for example, by sending an enquiry to an administrator of the first LAN 2.

The processing that is performed by the CPU 21 of the communication device 13 will be explained in detail with reference to flowcharts shown in FIG. 4 to FIG. 6. When an instruction to activate a remote conference application to hold a remote conference with the other communication device 13 is input by the user via the keyboard 263, the CPU 21 starts the main processing (refer to FIG. 4 and FIG. 5) by reading and executing the program stored in the HDD 24 of the communication device 13. The response processing (refer to FIG. 6) is activated and started during the main processing. The main processing and the response processing are performed in parallel with each other. Note that the main processing and the response processing are not limited to the example that is performed by the CPU 21, and may be performed by another electronic component (for example, an application specific integrated circuit (ASIC)). Further, the main processing and the response processing may be distributed and performed by a plurality of electronic devices (that is, a plurality of CPUs). Further, part of the main processing and the response processing may be performed by the CPU of the conference server 6.

Note that, in the main processing explained below, it is assumed that the first proxy setting is stored in advance in the HDD 24 of the communication device 14, and the main processing that is performed by the CPU 21 of the communication device 14 will be explained.

The main processing will be explained with reference to FIG. 4. The main processing will be specifically explained using an example in which the communication device 14 is connected to the second LAN 3 (refer to FIG. 1). First, the CPU 21 activates the response processing (refer to FIG. 6) (step S11). The response processing will be described in detail later. The CPU 21 activates the remote conference application. The CPU 21 displays, on the display 272, an input screen on which the conference ID and the code number can be input and a start button and an end button can be selected. In a state in which the conference ID and the code number have been input via the input screen, the CPU 21 determines whether the start button that is used to instruct the start of a remote conference has been selected (step S13). When the start button has not been selected (no at step S13), the CPU 21 determines whether the end button that is used to instruct the end of the remote conference application has been selected (step S35). When the end button has been selected (yes at step S35), the CPU 21 ends the remote conference application that has been activated and thereafter ends the main processing. When the end button has not been selected (no at step S35), the CPU 21 returns the processing to step S13. The CPU 21 repeats the processing at step S13.

It is assumed that the user of the communication device 14 inputs, to the communication device 13 via the keyboard 263, the conference ID and the code number notified in advance by the conference server 6 and selects the start button. When the start button is selected in a state in which the conference ID and the code number have been input (yes at step S13), the CPU 21 starts processing to hold the remote conference. In order to establish a session with the conference server 6, the CPU 21 transmits establishment request data that requests the establishment of the session to the proxy server 11 that is provided inside the second LAN 3 (step S15). The establishment request data includes the conference ID and the code number input via the input screen, and the device ID "14" of the communication device 14. When the CPU 21 transmits the establishment request data to the proxy server 12, the CPU 21 uses the first proxy setting stored in the HDD 24. The CPU 21 starts monitoring of reception of establishment response data that is transmitted from the conference server 6 in response to the establishment request data. The establishment response data is transmitted from the conference server 6 when the conference server 6 permits the establishment of the session in response to the establishment request data.

Since the first proxy setting of the proxy server 11 is stored in the HDD 24 of the communication device 14, it is possible to perform communication with the proxy server 11 using the first proxy setting. In this case, the proxy server 11 receives the establishment request data transmitted from the communication device 14 and transmits the establishment request data to the conference server 6. The CPU of the conference server 6 receives the establishment request data, and acquires the conference ID, the code number and the device ID "14" that are included in the establishment request data. When a combination of the acquired conference ID, code number and device ID is stored in the registration table 61 (refer to FIG. 1), the CPU of the conference server 6 permits the establishment of the session with the communication device 14 that has transmitted the establishment request data. In this case, the CPU of the conference server 6 associates the conference ID and the device ID acquired from the establishment request data and stores the associated conference ID and device ID in the conference table 62 (refer to FIG. 1). In order to notify the communication device 14 that the session establishment is permitted, the CPU of the conference server 6 transmits the establishment response data to the proxy server 11 that has transmitted the establishment request data. The proxy server 11 receives the establishment response data from the conference server 6. The proxy server 11 transmits the received establishment response data to the communication device 14 that has transmitted the establishment request data.

When the communication device 14 receives the establishment response data that has been transmitted from the conference server 6 in response to the establishment request data transmitted at step S15, the CPU 21 establishes the session with the conference server 6 (yes at step S17). The communication device 14 becomes able to hold the remote conference identified by the conference ID with the other communication device 13 which has specified the conference ID that is the same as the conference ID included in the establishment request data and which has established the session with the conference server 6. The CPU 21 stores the conference ID input via the input screen, in other words, the conference ID of the remote conference started by establishing the session, in the RAM 23 as the conference ID of the remote conference that is currently being held.

When a session is newly established with the communication device 14, the CPU of the conference server 6 refers to the conference table 62 and thereby identifies all the communication devices 13 that participate in the remote conference held by the newly established session. The CPU of the conference server 6 transmits ID notification data to all the identified communication devices 13. The ID notification data is transmitted to all the communication devices 13 that participate in the remote conference, in order to notify them of the device IDs of the other communication devices 13 that participate in the remote conference. The ID notification data is repeatedly transmitted in a predetermined cycle.

A specific explanation will be given using an example in which, in a state in which the remote conference that is identified by the conference ID "12345" is held by a session established between the communication device 14 and the conference server 6, a session is newly established between the communication device 15 and the conference server 6 and the communication device 15 participates in the remote conference identified by the conference ID "12345". The CPU of the conference server 6 selects, from the conference table 62, the device IDs "14" and "15" that are associated with the conference ID "12345". The CPU of the conference server 6 transmits the ID notification data that includes the selected device ID "14" to the communication device 15 that is identified by the selected device ID "15". Further, the CPU of the conference server 6 transmits the ID notification data that includes the selected device ID "15" to the communication device 14 that is identified by the selected device ID "14".

After the CPU 21 of each of the communication devices 14 and 15 has established the session with the conference server 6 (yes at step S17, refer to FIG. 4), when the ID notification data is transmitted from the conference server 6, the CPU 21 of each of the communication devices 14 and 15 receives the ID notification data. The received ID notification data includes the device ID of the other communication device 13 that participates in the remote conference (the conference ID "12345") that is currently being held. When the ID notification data is received, the CPU 21 acquires the device ID included in the ID notification data. The CPU 21 determines whether the acquired device ID is stored in the RAM 23, and thereby determines whether there is another of the communication devices 13 that has newly participated in the remote conference that is currently being held (step S23). When the CPU 21 receives the ID notification data from the conference server 6 and the device ID acquired from the received ID notification data is not stored in the RAM 23, the CPU 21 determines that the communication device 13 that is identified by the acquired device ID is the communication device 13 that has newly participated in the remote conference that is currently being held (yes at step S23). In order to notify the communication device 13 identified by the acquired device ID of information relating to the communication device 14 itself, the CPU 21 transmits information notification data to the conference server 6 (step S25). The information notification data includes the device ID, the IP address and the NW address stored in the device information table 241 (refer to FIG. 2). Further, the information notification data includes a destination device ID of the information notification data, which is a device ID that is not stored in the RAM 23 among the device IDs acquired from the ID notification data. The CPU 21 stores the device ID acquired from the ID notification data in the RAM 23 (step S27). The CPU 21 returns the processing to step S23 and repeats the processing.

When the information notification data is received from the communication device 14, the CPU of the conference server 6 acquires the destination device ID included in the information notification data. The CPU of the conference server 6 transmits the received information notification data to the communication device 13 that is identified by the acquired destination device ID.

When the ID notification data is not received from the conference server 6 or when the device ID acquired from the received ID notification data is stored in the RAM 23 (no at step S23), the CPU 21 determines whether the information notification data has been received from the conference server 6 (step S29). When the information notification data has not been received (no at step S29), the CPU 21 advances the processing to step S37.

On the other hand, when the information notification data has been received from the conference server 6 (yes at step S29), the CPU 21 acquires the device ID, the IP address and the NW address included in the received information notification data. The communication device 13 that is identified by the acquired device ID is the communication device 13 that has newly participated in the remote conference that is currently being held. The CPU 21 stores the acquired device ID, IP address and NW address in the history information table 242 (refer to FIG. 3) (step S31). The CPU 21 associates "1" with the number of conferences and stores the associated information in the history information table 242 (step S33). The CPU 21 advances the processing to step S37.

Note that, when the device ID that is the same as the device ID acquired from the information notification data has already been stored in the history information table 242, the CPU 21 replaces the IP address and the NW address stored in association with the same device ID with the IP address and the NW address acquired from the information notification data (step S31). Further, the CPU 21 updates the number of conferences by adding "1" to the corresponding number of conferences (step S33). The CPU 21 advances the processing to step S37. In this manner, the CPU 21 can easily create and manage the history information table 242.

At step S37, the CPU 21 determines whether an instruction to end the remote conference that is currently being held has been input via the keyboard 263 (step S37). When the instruction to end the remote conference has not been input (no at step S37), the CPU 21 returns the processing to step S23. On the other hand, when the instruction to end the remote conference has been input (yes at step S37), the CPU 21 transmits, to the conference server 6, withdrawal notification data to notify withdrawal from the remote conference that is currently being held. The withdrawal notification data includes the device ID "14" of the communication device 14 itself and the conference ID of the remote conference that is currently being held. The CPU 21 terminates the session with the conference server 6. The CPU 21 returns the processing to step S13.

When the withdrawal notification data is received from the communication device 13, the CPU of the conference server 6 acquires the device ID and the conference ID that are included in the withdrawal notification data. The CPU of the conference server 6 deletes the acquired device ID, among the device IDs that have been associated with the acquired conference ID and stored in the conference table 62 (refer to FIG. 1). The conference server 6 terminates the session with the communication device 13 that has transmitted the withdrawal notification data.

A specific explanation will be given using an example in which the communication device 14 is moved from the second LAN 3 (refer to FIG. 1) and is connected to the first LAN 2 (refer to FIG. 1). Note that the device information table 241 stored in the HDD 24 of the communication device 14 is updated from the device information table 2411 (refer to FIG. 2) to the device information table 2412 (refer to FIG. 2) by the communication device 14 being connected to the first LAN 2.

Since the proxy server 12 is provided in the first LAN 2, the communication device 14 cannot perform communication with the proxy server 12 even if the communication device 14 uses the first proxy setting to perform communication with the proxy server 11. Therefore, the CPU 21 cannot receive the establishment response data in response to the establishment request data transmitted at step S15, and it cannot establish a session with the conference server 6 (no at step S17). In this case, the CPU 21 determines that the session is not established using the first proxy setting when the establishment request data is not received. In this case, in order for the communication device 14 to transmit the establishment request data to the conference server 6 and to establish the session with the conference server 6, it is necessary to acquire the second proxy setting of the proxy server 12 and to store the second proxy setting in the HDD 24. The CPU 21 performs request processing (refer to FIG. 5) in order to acquire the second proxy setting from the communication device 13 that connects to the first LAN 2 to which the communication device 14 connects (step S19).

The request processing will be explained with reference to FIG. 5. The CPU 21 refers to the device information table 2412 (refer to FIG. 2) and acquires the NW address "255.255.255.0" (step S41). The CPU 21 determines whether the NW addresses that are not the target of the processing at step S45 to step S51 remain in the history information table 242 (refer to FIG. 3) (step S43). When the NW addresses that are not the target of the processing at step S45 to step S51 remain in the history information table 242 (yes at step S43), the CPU 21 selects one of the NW addresses that are not the target of the processing at step S45 to step S51 (step S45). The CPU 21 determines whether the NW address "255.255.255.0" acquired from the device information table 241 at step S41 matches the NW address selected from the history information table 242 at step S45 (step S47). When it is determined that the two NW addresses are different from each other (no at step S47), the CPU 21 returns the processing to step S43.

As shown in FIG. 1, the NW address "255.255.255.0" acquired from the device information table 241 at step S41 is stored in the history information table 242 (refer to FIG. 3). The CPU 21 determines that the NW address "255.255.255.0" acquired from the device information table 241 at step S41 matches the NW address selected from the history information table 242 at step S45 (yes at step S47). That is, the NW address of the first LAN 2 to which the communication device 14 attempts to connect is included in the history information table 242. In this case, it is indicated that the communication device 14 has held a remote conference in the past with the communication device 15 that is identified by the device ID "15" associated with the NW address "255.255.255.0" that is determined at step S47 to match the NW address selected from the history information table 242. Note that the communication device 15 connects to the first LAN 2 to which the communication device 14 connects.

The CPU 21 acquires, from the history information table 242, the device ID "15" associated with the NW address "255.255.255.0" that is determined to match at step S47. The CPU 21 transmits setting request data, which requests transmission of the proxy setting, to the communication device 15 identified by the acquired device ID "15" (step S51). The setting request data includes the device ID stored in the device information table 241, in other words, the device ID "14" of the communication device 14 itself. Further, the setting request data includes the conference ID and the code number input via the input screen. The setting request data is transmitted to the IP address "192.168.10.1" that is associated with the NW address "255.255.255.0" in the history information table 242.

Figure 6:
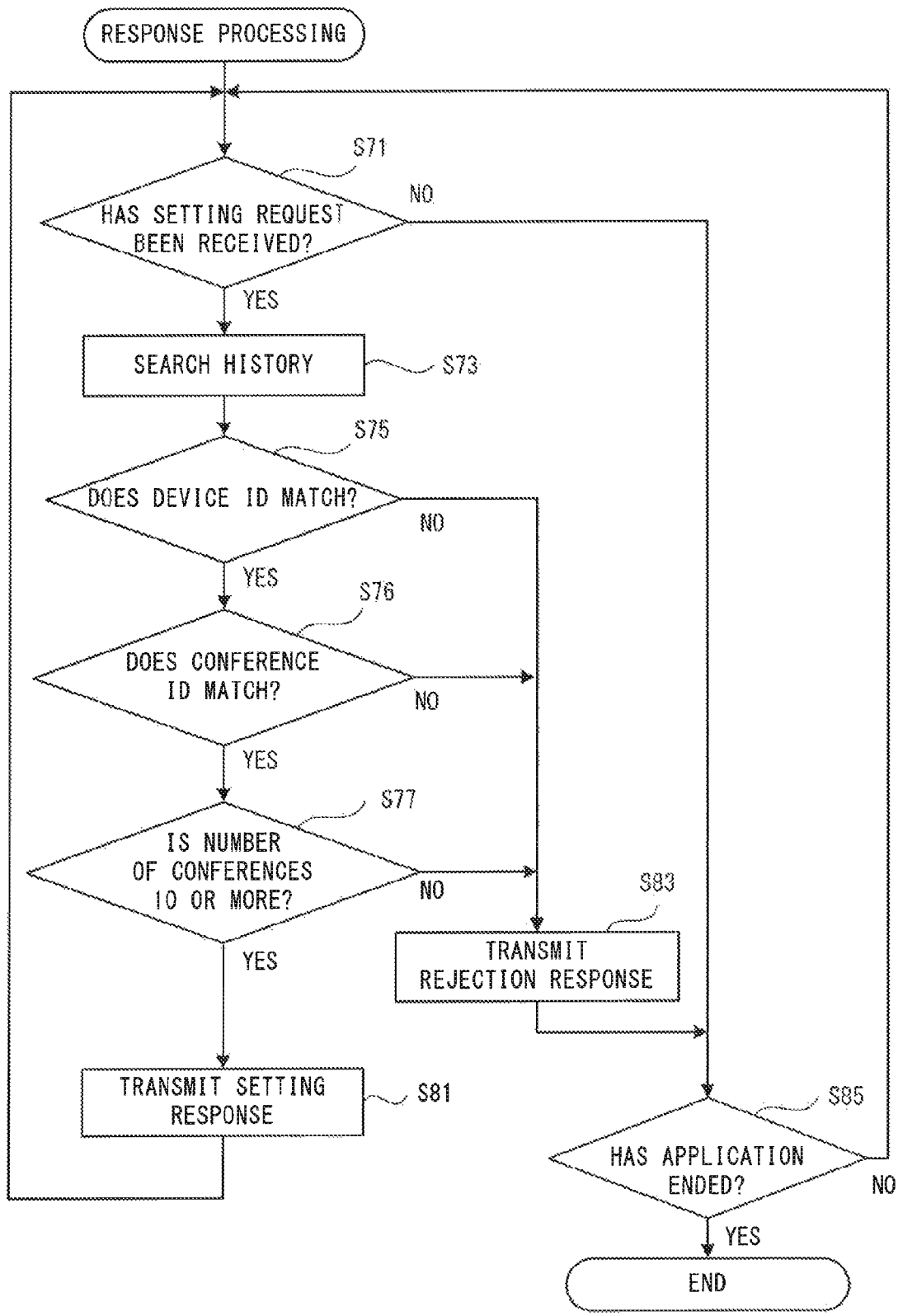
FIG. 6 is a flowchart illustrating response processing.

The CPU 21 of the communication device 15 that has received the setting request data transmitted from the communication device 14 sends back setting response data or rejection response data to the communication device 13 (step S81, step S83, refer to FIG. 6). After transmitting the setting request data to the communication device 15 at step S51, the CPU 21 of the communication device 14 starts to monitor reception of the setting response data or the rejection response data to be sent back from the communication device 15.

When the CPU 21 receives the setting response data from the communication device 15 after transmitting the setting request data to the communication device 15 at step S51 (yes at step S53), the CPU 21 acquires the second proxy setting included in the setting response data. The CPU 21 replaces the first proxy setting stored in the HDD 24 with the acquired second proxy setting, and thereby updates the proxy setting stored in the HDD 24 (step S55). The CPU 21 ends the request processing and returns the processing to the main processing (refer to FIG. 4).

On the other hand, when the CPU 21 receives the rejection response data from the communication device 15 after transmitting the setting request data to the communication device 15 at step S51 (no at step S53, yes at step S57), the CPU 21 cannot acquire the second proxy setting. In this case, the CPU 21 returns the processing to step S43 in order to repeatedly perform the processing at step S43 to step S51 based on the other NW addresses stored in the history information table 242.

Meanwhile, when the CPU 21 does not receive the setting response data and the rejection response data from the communication device 15 after transmitting the setting request data to the communication device 15 at step S51 (no at step S57), the CPU 21 determines whether a predetermined time period (for example, 10 seconds) has elapsed after transmitting the setting request data at step S51 (step S59). When the predetermined time period has not elapsed (no at step S59), the CPU 21 returns the processing to step S53 in order to continue to monitor the reception of the setting response data or the rejection response data to be sent back from the communication device 15. When the predetermined time period has elapsed (yes at step S59), the CPU 21 returns the processing to step S43 in order to repeatedly perform the processing at step S43 to step S51 based on the other NW addresses stored in the history information table 242.

Figure 4:
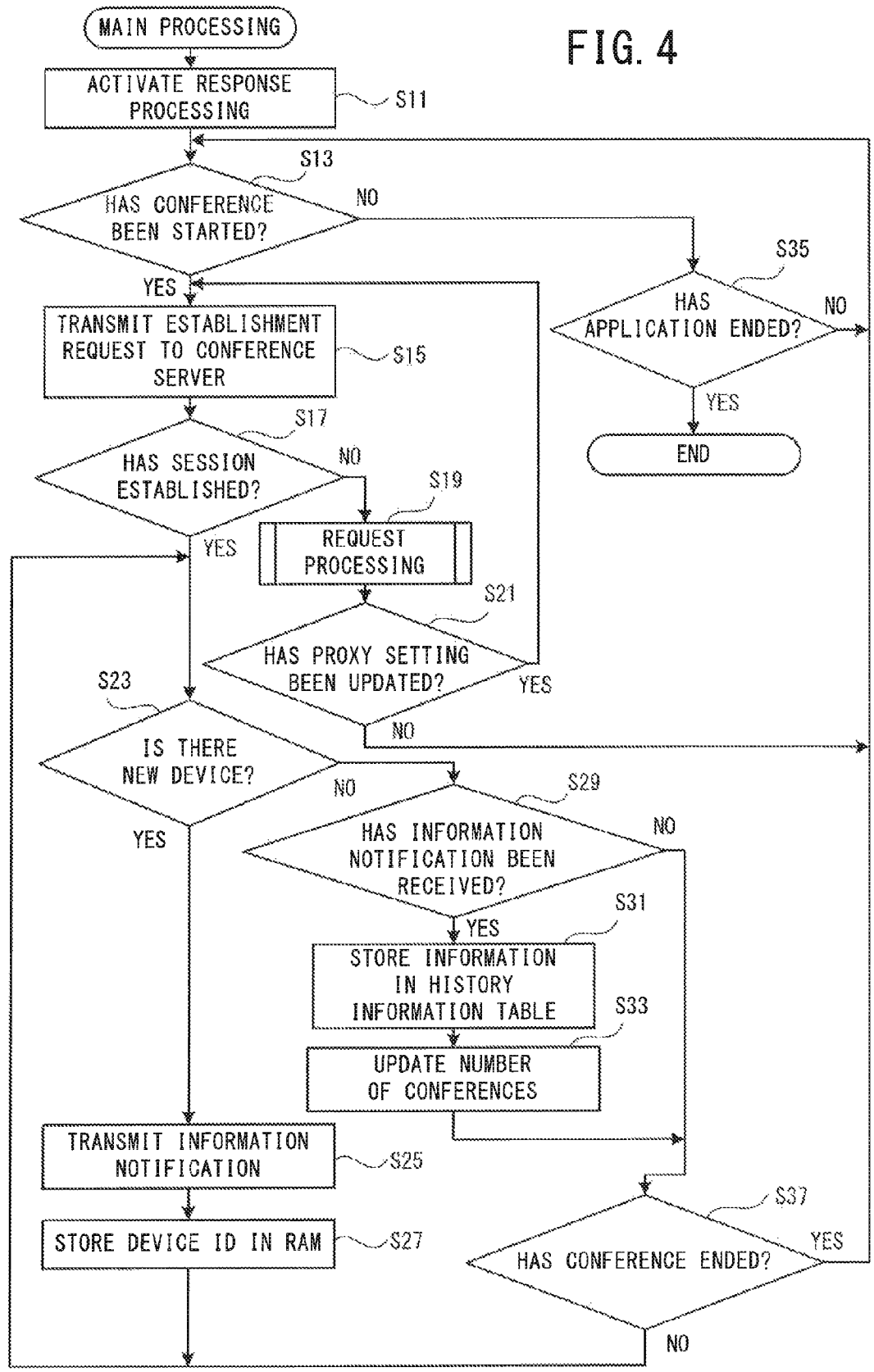
FIG. 4 is a flowchart illustrating main processing.

As shown in FIG. 4, after the request processing (step S19) ends, the CPU 21 determines whether the first proxy setting stored in the HDD 24 has been updated to the second proxy setting (step S21). When the rejection response data has been received in the request processing (refer to FIG. 5) (yes at step S57, refer to FIG. 5), or when no response has been received from the conference server 6 in the request processing (no at step S59), the first proxy setting stored in the HDD 24 has not been updated (no at step S21). In this case, it is indicated that the communication device 14 is not able to participate in the remote conference of the conference ID input via the input screen displayed on the display 272, and therefore, the CPU 21 returns the processing to step S13. The CPU 21 continues to display the input screen on the display 272 and continues to monitor whether another conference ID and another code number are input.

Figure 5:
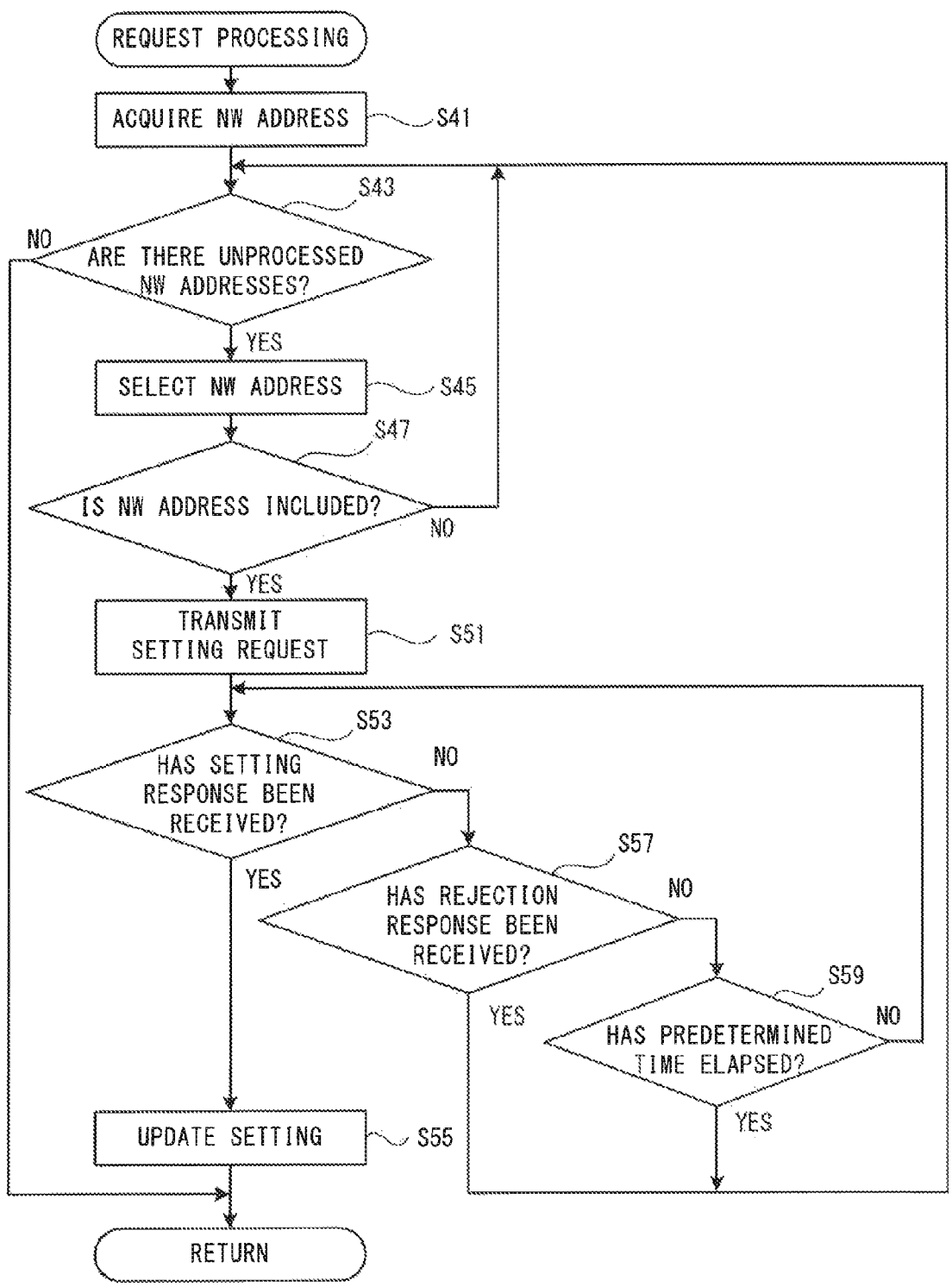
FIG. 5 is a flowchart illustrating request processing.

On the other hand, when the setting response data has been received in the request processing (refer to FIG. 5) (yes at step S53, refer to FIG. 5), the first proxy setting stored in the HDD 24 has been updated to the second proxy setting (step S55, refer to FIG. 5). When it is determined that the first proxy setting has been updated to the second proxy setting (yes at step S21), the CPU 21 returns the processing to step S15.

At step S15, the CPU 21 transmits the establishment request data to the proxy server 12 in order to establish a session with the conference server 6 (step S15). When the CPU 21 transmits the establishment request data to the proxy server 12, the CPU 21 uses the second proxy setting. The second proxy setting has been acquired from the communication device 15 that connects to the first LAN 2 to which the communication device 14 connects. The communication device 15 is performing communication with the proxy server 12 using the second proxy setting. For that reason, the communication with the proxy server 12 that is performed using the second proxy setting succeeds. The CPU 21 receives the establishment response data that is transmitted from the conference server 6 in response to the establishment request data, and establishes the session with the conference server 6 (yes at step S17). The CPU 21 stores the conference ID input via the input screen, in other words, the conference ID of the remote conference started by the establishment of the session, in the RAM 23.

The response processing will be explained with reference to FIG. 6. Note that the response processing will be explained below on the assumption that the second proxy setting of the proxy server 12 that is provided inside the first LAN 2 to which the communication device 15 connects is stored in advance in the HDD 24. A case will be explained in which the response processing is performed by the CPU 21 of the communication device 15 that is connected to the first LAN 2 (refer to FIG. 1).

The CPU 21 determines whether the setting request data has been received (step S71). When the setting request data has not been received (no at step S71), the CPU 21 advances the processing to step S85. At step S85, the CPU 21 determines whether the end button to instruct the end of the remote conference application has been selected (step S85). When the end button has been selected (yes at step S85), the CPU 21 ends the remote conference application that has been activated and thereafter ends the response processing. When the end button has not been selected (no at step S85), the CPU 21 returns the processing to step S71. The CPU 21 repeats the processing at step S71.

It is assumed that the communication device 14 that has been moved from the second LAN 3 is connected to the first LAN 2 (the arrow 5, refer to FIG. 1) and the setting request data is transmitted from the communication device 14 (step S51, refer to FIG. 5). The CPU 21 receives the setting request data (yes at step S71).

The CPU 21 acquires the device ID "14" and the conference ID "12345" included in the received setting request data. The CPU 21 searches the history information table 242 (refer to FIG. 3) (step S73). The CPU 21 determines whether the acquired device ID "14" is stored in the history information table 242 (step S75). When the acquired device ID "14" is not stored in the history information table 242 (no at step S75), it means that a remote conference has not been held in the past with the communication device 14 identified by the device ID "14". In this case, in order to inhibit the communication device 14 that has transmitted the setting request data from establishing a session with the conference server 6, the CPU 21 transmits the rejection response data to the communication device 14 (step S83). The CPU 21 advances the processing to step S85.

When the communication device 14 connected to the first LAN 2 receives the rejection response data in response to the setting request data (yes at step S57, refer to FIG. 5), the communication device 14 cannot acquire the second proxy setting to perform communication with the proxy server 12, and thus cannot perform communication with the proxy server 12. Therefore, the communication device 14 cannot establish a session with the conference server 6.

When the device ID acquired from the setting request data is stored in the history information table 242 (yes at step S75), the CPU 21 determines whether the conference ID acquired from the setting request data is stored in the RAM 23 (step S76). Note that, when the communication device 15 has established a session with the conference server 6, the conference ID input via the input screen, in other words, the conference ID of the remote conference that is currently being held, is stored in the RAM 23. When the conference ID acquired from the setting request data is not stored in the RAM 23 (no at step S76), the remote conference in which the communication device 14 that has transmitted the setting request data attempts to participate is different from the remote conference that is currently being performed by the communication device 15 itself. In this case, in order to inhibit the communication device 14 that has transmitted the setting request data from establishing a session with the conference server 6, the CPU 21 transmits the rejection response data to the communication device 14 (step S83). The CPU 21 advances the processing to step S85.

On the other hand, when the conference ID acquired from the setting request data is stored in the RAM 23 (yes at step S76), the remote conference in which the communication device 14 that has transmitted the setting request data attempts to participate matches the remote conference that is currently being performed by the communication device 15 itself. The CPU 21 refers to the history information table 242, and acquires the number of conferences that is associated with the device ID acquired from the setting request data. The CPU 21 determines whether the acquired number of conferences is equal to or more than a predetermined number (ten) (step S77). When the acquired number of conferences is less than the predetermined number (no at step S77), the CPU 21 transmits the rejection response data to the communication device 14 in order to inhibit the communication device 14 that has transmitted the setting request data from establishing a session with the conference server 6 (step S83). The CPU 21 advances the processing to step S85.

When the acquired number of conferences is equal to or more than the predetermined number (yes at step S77), the CPU 21 transmits the setting response data to the communication device 14 that has transmitted the setting request data (step S81). The setting response data includes the second proxy setting stored in the HDD 24. The CPU 21 returns the processing to step S71.

Note that the CPU 21 of the communication device 14 that has received the setting response data in response to the setting request data acquires the second proxy setting included in the received setting response data, and stores the second proxy setting in the HDD 24 (step S55, refer to FIG. 5). The CPU 21 of the communication device 14 is able to perform communication with the proxy server 12 provided inside the first LAN 2, by using the second proxy setting stored in the HDD 24. It is thus possible to establish the session with the conference server 6 and to start the remote conference.

As explained above, the communication device 13 transmits the setting request data to the other communication device 13 that connects to the LAN 4 to which the communication device 13 connects (step S51). Thus, the communication device 13 is able to acquire, from the other communication device 13, the second proxy setting of the proxy server 10 provided inside the LAN 4 (yes at step S53). The communication device 13 updates the first proxy setting stored in the HDD 24 to the acquired second proxy setting (step S55). Thus, the communication device 13 is able to perform communication with the conference server 6 via the proxy server 10 provided inside the LAN 4. Therefore, even when the second proxy setting is not stored in advance in the HDD 24, the communication device 13 is able to appropriately perform communication with the conference server 6 via the proxy server 10 and to establish a session with the conference server 6 (yes at step S17).

For example, as shown in FIG. 1, when the communication device 14 in which the first proxy setting of the proxy server 11 is stored in the HDD 24 is moved from the second LAN 3 and is connected to the first LAN 2, the second proxy setting of the proxy server 12 provided inside the first LAN 2 is not stored in the HDD 24. Therefore, the communication device 14 cannot perform communication with the conference server 6 via the proxy server 12. To address this, the communication device 14 transmits the setting request data to the communication device 15 with which a remote conference has been held in the past via the conference server 6. Thus, the communication device 14 acquires the second proxy setting from the communication device 15 and stores it in the HDD 24. The communication device 14 is able to perform communication with the proxy server 12 by using the second proxy setting stored in the HDD 24, and it is thus possible to perform communication with the conference server 6 via the proxy server 12 and to establish a session with the conference server 6. Therefore, even when the communication device 14 does not have the function to automatically acquire the proxy setting from the proxy server 12 and to set the proxy setting, the communication device 14 is able to hold a remote conference by establishing a session with the conference server 6.

Further, when the communication device 13 receives the setting request data from the other communication device 13, the communication device 13 transmits the setting response data to the other communication device 13 and thereby notifies the other communication device 13 of the second proxy setting (step S79). This makes it possible for the other communication device 13 to perform communication with the conference server 6 via the proxy server 10.

Further, when the communication device 13 receives the setting request data from the other communication device 13 with which a remote conference has been held in the past (yes at step S75), the communication device 13 transmits the setting response data and thereby notifies the other communication device 13 of the second proxy setting (step S79). The communication device 13 does not notify the other communication device 13 with which no remote conference has been held in the past of the second proxy setting (no at step S75). In this manner, the communication with the conference server 6 that is performed via the proxy server 10 can be limited to the other communication device 13 with which a remote conference has been held in the past. It is thus possible to improve security of the LAN 4.

When the number of conferences with the other communication device 13 is equal to or more than the predetermined number (yes at step S77), the communication device 13 transmits the second proxy setting (step S79). When the number of conferences with the other communication device 13 is less than the predetermined number (no at step S77), the communication device 13 does not transmit the second proxy setting. In this manner, the communication device 13 can limit the communication with the conference server 6 that is performed via the proxy server 10 to the other communication device 13 with which remote conferences have been held at least the predetermined number of times. It is thus possible to further improve the security of the LAN 4.

When the remote conference that is the same as the remote conference that is scheduled to be held after the other communication device 13 establishes a session with the conference server 6 is already being held (yes at step S76), the communication device 13 notifies the other communication device 13 of the second proxy setting (step S79). When the session with the conference server 6 has not been established or when the same remote conference is not being held (no at step S76), the communication device 13 does not notify the other communication device 13 of the second proxy setting. In this manner, the communication device 13 can limit the communication that is performed via the proxy server 10 to the other communication device 13 that attempts to participate in the remote conference that is currently being held. It is thus possible to further improve the security of the LAN 4.

Note that the present disclosure is not limited to the above-described embodiment and various modifications are possible. Hereinafter, modified examples of the present disclosure will be explained.

Figure 7:
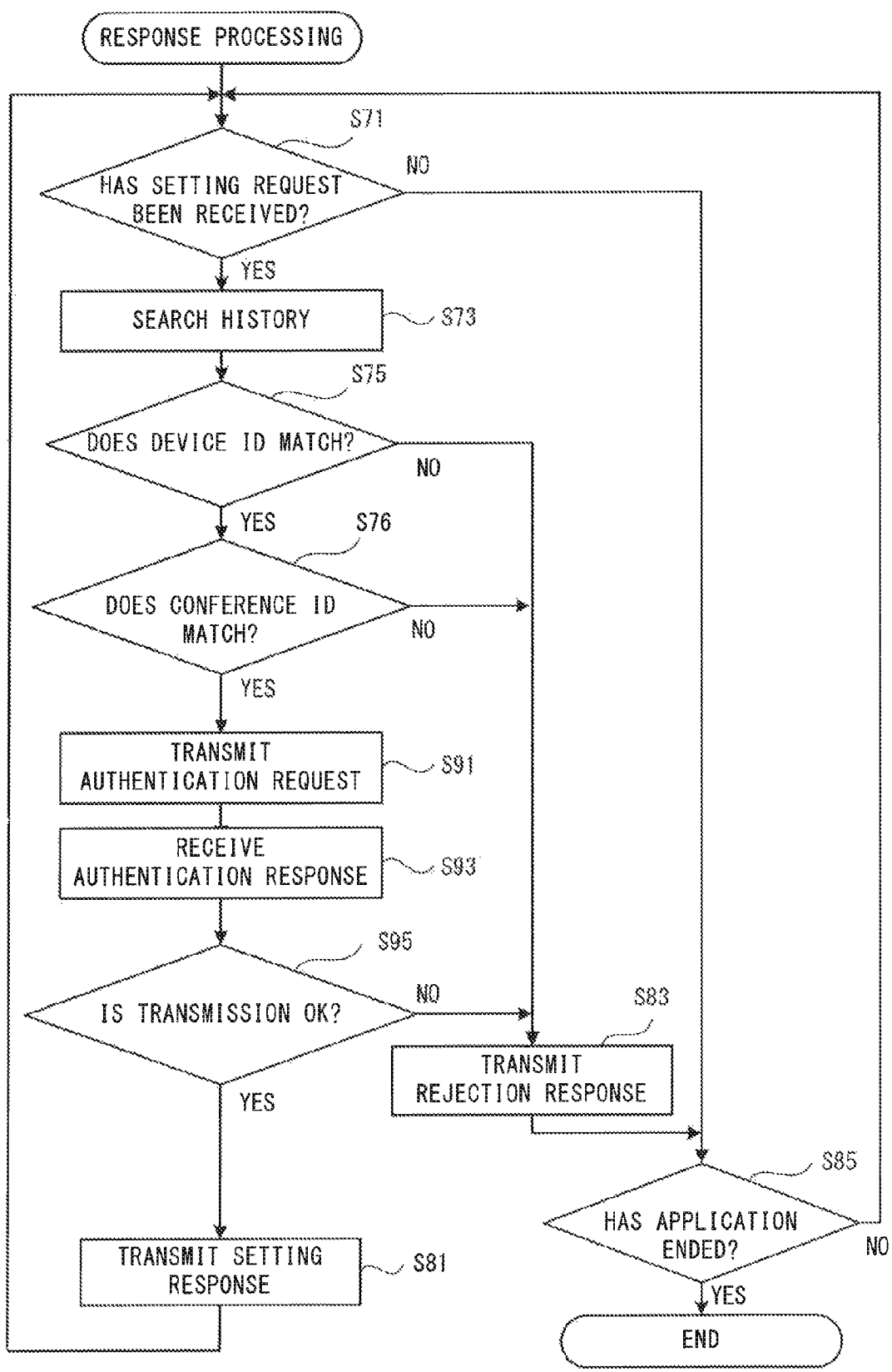
FIG. 7 is a flowchart illustrating response processing according to a modified example.

Response processing according to a modified example of the present disclosure will be explained with reference to FIG. 7. Note that the modified response processing shown in FIG. 7 is activated at step S11 of the main processing shown in FIG. 4 and is started. Processing that is the same as in the response processing (refer to FIG. 6) according to the above-described embodiment is denoted by the same reference numeral, and an explanation thereof is omitted here.

The response processing according to the modified example differs from the response processing (refer to FIG. 6) according to the above-described embodiment in the following points. When the setting request data is received (yes at step S71), the CPU 21 acquires the conference ID, the code number and the device ID included in the setting request data. When the conference ID acquired from the setting request data is stored in the RAM 23 (yes at step S76), in other words, when the remote conference in which the communication device 14 that has transmitted the setting request data attempts to participate is currently being performed by the communication device 15 itself, the CPU 21 transmits authentication request data to the conference server 6 in order to request authentication of the communication device 14 from the conference server 6 (step S91). The authentication request data includes the device ID acquired from the setting request data, in other words, the device ID "14" of the communication device 14 that has transmitted the setting request data. Further, the authentication request data includes the conference ID and the code number acquired from the setting request data. The conference server 6 receives the authentication request data transmitted from the communication device 13.

The CPU of the conference server 6 acquires the device ID "14", the conference ID and the code number included in the received authentication request data. The CPU of the conference server 6 determines whether the acquired device ID "14", conference ID and code number have been associated with each other and stored in the registration table 61 (refer to FIG. 1). When the acquired device ID "14", conference ID and code number have been associated with each other and stored in the registration table 61, or when transmission of the setting response data to the communication device 14 identified by the device ID "14" is permitted and the acquired device ID "14", conference ID and code number have not been stored in the registration table 61, the CPU of the conference server 6 prohibits the transmission of the setting response data to the communication device 14. The CPU of the conference server 6 transmits authentication response data, which includes permission/non-permission of the transmission of the setting response data, to the communication device 14 that has transmitted the authentication request data.

The CPU 21 of the communication device 15 receives the authentication response data transmitted from the conference server 6 (step S93). The CPU 21 acquires information included in the received authentication response data. When the information that permits the transmission of the setting response data is acquired (yes at step S95), the CPU 21 transmits the setting response data to the communication device 14 that has transmitted the setting request data (step S81). On the other hand, when the information that prohibits the transmission of the setting response data is acquired (no at step S95), the CPU 21 transmits the rejection response data to the communication device 14 that has transmitted the setting request data (step S83).

As explained above, in the modified example, the communication device 15 determines whether to transmit to the communication device 14 the setting response data that notifies the communication device 14 of the second proxy setting, by transmitting an enquiry to the conference server 6 (step S91). When the transmission of the setting request data is permitted by the conference server 6 (yes at step S95), the communication device 15 transmits the setting response data to the communication device 14 and thereby notifies the communication device 14 of the second proxy setting (step S81). On the other hand, when the transmission of the setting request data is prohibited by the conference server 6 (no at step S95), the communication device 15 transmits the rejection response data to the communication device 14 (step S83) and does not notify the communication device 14 of the second proxy setting. In this manner, the communication device 15 can limit the communication that is performed via the proxy server 12 to the communication device 14 that is permitted by the conference server 6. It is thus possible to further improve the security of the first LAN 2.

In the above-described embodiment, the CPU 21 uses the NW address as the information that identifies the LAN 4. When the NW address stored in the device information table 241 is stored in the history information table 242, the CPU 21 determines that the communication device 13 identified by the device ID associated with this NW address is the other communication device 13 that connects to the same LAN 4 (step S47). However, the information that identifies the LAN 4 is not limited to the NW address. The CPU 21 may identify the LAN 4 using information that is different from the NW address. For example, the CPU 21 may identify the LAN 4 by a domain name that is assigned to the LAN 4.

In the above-described embodiment, the CPU 21 identifies the communication device 13 using the device ID. However, the information that identifies the device ID is not limited to the device ID. The CPU 21 may identify the communication device 13 using information that is different from the device ID. For example, the CPU 21 may identify the communication device 13 using an IP address that is assigned to the communication device 13.

In the above-described embodiment, the device information table 241 and the history information table 242 are stored in the HDD 24 of the communication device 13. However, the device information table 241 and the history information table 242 may be stored in a medium other than the HDD 24 of the communication device 13. For example, the device information table 241 and the history information table 242 may be stored in an HDD of the conference server 6.

In the above-described modified example, the CPU 21 transmits the authentication request data to the conference server 6 (step S91), and based on the authentication response data that is sent back from the conference server 6, the CPU 21 determines whether to perform notification of the second proxy setting (step S93, step S95). The transmission destination of the authentication request data is not limited to the conference server 6. For example, the CPU 21 may transmit the authentication request data to an authentication server (not shown in the drawings) that is connected to the Internet 18. The CPU 21 may determine whether to perform notification of the second proxy setting, based on the authentication response data that is sent back from the authentication server.

In the above-described embodiment, when the setting request data is received (yes at step S71), when the device ID acquired from the setting request data is stored in the history information table 242 (yes at step S75), when the conference ID acquired from the setting request data is stored in the RAM 23 (yes at step S76), and when the number of conferences is equal to or more than ten (yes at step S77), the CPU 21 transmits the setting response data (step S83). However, the CPU 21 may determine whether to transmit the setting response data using a method other than that described above. For example, the CPU 21 may determine whether to transmit the setting response data, based on a table that stores in advance the device ID of the communication device 13 to which the setting response data is to be transmitted. Note that the table may be input in advance by the user via the keyboard 263. In this case, the CPU 21 may use a table that is used for another purpose. Further, for example, the CPU 21 may accumulate the number of the communication devices 13 that have transmitted the setting response data and may store the accumulated number in the RAM 23. The CPU 21 may transmit the setting response data to the communication device 13 that has transmitted the setting request data when the accumulated number of the communication devices 13 is less than a predetermined number, and the CPU 21 may prohibit the transmission of the setting response data to the communication device 13 that has transmitted the setting request data when the accumulated number of the communication devices 13 is equal to or more than the predetermined number.

The CPU 21 may store cumulative time, which is the accumulated time of the participation in the remote conferences, instead of storing the number of conferences in the history information table 242. When the setting request data is received, the CPU 21 may refer to the cumulative time that is associated with the device ID of the communication device 13 that has transmitted the setting request data. The CPU 21 may transmit the setting response data when the cumulative time is a predetermined time or more, and the CPU 21 may prohibit the transmission of the setting response data when the cumulative time is less than the predetermined time.

What is claimed is:

1. A communication system comprises:
a first communication device configured to connect to a first local area network (LAN); and
a second communication device configured to connect to the first LAN, wherein
the first communication device comprises
a first processor, and
a first memory storing computer-readable instructions, the computer-readable instructions, when executed by the first processor, perform processes comprising:
a first communicating operation communicating from inside the first LAN with a conference server via a proxy server to establish a session for a remote conference between the first communication device and the conference server using a first proxy setting, the conference server being provided outside the first LAN, the proxy server being provided inside the first LAN, the first proxy setting being stored in a storage device of the first communication device and being a setting to communicate via a specific proxy server;
a first determining operation determining whether establishment of the session has succeeded using the first proxy setting by the first communicating operation;
a first storing operation storing in the storage device, when the determination by the first determining operation that the establishment of the session has succeeded, device information of a third communication device in association with specific LAN information as history information, the third communication device participating in the remote conference, the specific LAN information identifying a specific LAN to which the third communication device connects, and the device information being received from the conference server;
a second determining operation determining, in response to the determination by the first determining operation that the establishment of the session has failed, whether first LAN information identifying the first LAN is included in the history information stored in the storage device;
a first transmitting operation transmitting directly without the conference server, in response to the determination by the second determining operation that the first LAN information identifying the first LAN is included in the history information, setting request data to the second communication device identified by device information associated with the first LAN information in the history information, the setting request data being data to request a second proxy setting and being data that includes at least first device information of the first communication device and identifying the first communication device, the second proxy setting being a setting to communicate with the conference server from inside the first LAN via the proxy server;
a second communication operation communicating, in response to receiving of the second proxy setting from the second communication device, with the conference server to establish a session with the conference server using the second proxy setting,
a third determining operation determining whether establishment of the session has succeeded using the second proxy setting by the second communicating operation; and
a second storing operation storing in the storage device, when the determination by the third determining operation that the establishment of the session has succeeded, the device information of the third communication device in association with the first LAN information as history information and wherein
the second communication device comprises
a second processor, and
a second memory storing computer-readable instructions, the computer-readable instructions stored in the second memory, when executed by the second processor, perform processes comprising:
a fourth determining operation determining, in response to receiving of the setting request data from the first communication device directly without the conference server, whether to transmit the second proxy setting stored in a storage device of the second communication device to the first communication device, based on the first device information included in the setting request data; and
a second transmitting operation transmitting directly without the conference server, in response to the determination by the fourth determining operation that the second proxy setting is to be transmitted to the third communication device, the second proxy setting to the first communication device.

2. A communication device comprising:
a processor, and
a memory storing computer-readable instructions, the computer-readable instructions, when executed by the processor, perform processes comprising:
a first communicating operation communicating from inside a first local area network (LAN) with a conference server via a proxy server to establish a session for a remote conference between the communication device and the conference server using a first proxy setting, the conference server being provided outside the first LAN, the proxy server being provided inside the first LAN, the first proxy setting being stored in a storage device of the communication device and being a setting to communicate via a specific proxy server;
a first determining operation determining whether establishment of the session has succeeded using the first proxy setting by the first communicating operation;
a storing operation storing in the storage device, when the determination by the first determining operation that the establishment of the session has succeeded, device information of another communication device in association with specific LAN information as history information, the other communication device participating in the remote conference, the specific LAN information identifying a specific LAN to which the other communication device connects, and the device information being received from the conference server;
a second determining operation determining, in response to the determination by the first determining operation that the establishment of the session has failed, whether first LAN information identifying the first LAN is included in the history information stored in the storage device;

a first transmitting operation transmitting directly without the conference server, in response to the determination by the second determining operation that the first LAN information identifying the first LAN is included in the history information, setting request data to a specific communication device identified by device information associated with the first LAN information in the history information, the setting request data being data to request a second proxy setting and being data that includes at least device information of the communication device and identifying the communication device, the second proxy setting being a setting to communicate with the conference server from inside the first LAN via the proxy server;

a second communication operation communicating, in response to receiving of the second proxy setting from the specific communication device, with the conference server to establish a session for a remote conference between the communication device and the conference server using the received second proxy setting, a third determining operation determining whether establishment of the session has succeeded using the second proxy setting by the second communicating operation; and a second storing operation storing in the storage device, when the determination by the third determining operation that the establishment of the session has succeeded, the device information of the other communication device in association with the first LAN information as history information.

3. A non-transitory computer-readable medium storing computer-readable instructions, the computer-readable instructions, when executed by a processor of a communication device, perform processes comprising:

a first communicating operation communicating from inside a first local area network (LAN) with a conference server via a proxy server to establish a session for a remote conference between the communication device and the conference server using a first proxy setting, the conference server being provided outside the first LAN, the proxy server being provided inside the first LAN, the first proxy setting being stored in a storage device of the communication device and being a setting to communicate via a specific proxy server;

a first determining operation determining whether establishment of the session has succeeded using the first proxy setting by the first communicating operation;

a first storing operation storing in the storage device, when the determination by the first determining operation that the establishment of the session has succeeded, device information of another communication device in association with specific LAN information as history information, the other communication device participating in the remote conference, the specific LAN information identifying a specific LAN to which the other communication device connects, and the device information being received from the conference server;

a second determining operation determining, in response to the determination by the first determining operation that the establishment of the session has failed, whether first LAN information identifying the first LAN is included in the history information stored in the storage device;

a first transmitting operation transmitting directly without the conference server, in response to the determination by the second determining operation that the first LAN information identifying the first LAN is included in the history information, setting request data to a specific communication device identified by device information associated with the first LAN information in the history information, the setting request data being data to request a second proxy setting and being data that includes at least device information of the communication device and identifying the communication device, the second proxy setting being a setting to communicate with the conference server from inside the first LAN via the proxy server;

a second communication operation communicating, in response to receiving of the second proxy setting from the specific communication device, with the conference server to establish a session for a remote conference between the communication device and the conference server using the second proxy setting, a third determining operation determining whether establishment of the session has succeeded using the second proxy setting by the second communicating operation; and a second storing operation storing in the storage device, when the determination by the third determining operation that the establishment of the session has succeeded, the device information of the other communication device in association with the first LAN information as history information.

4. The non-transitory computer-readable medium according to claim 3, wherein the computer-readable instructions, when executed by the processor, further perform processes comprising:

a fourth determining operation determining, in response to receiving of the setting request data from the other communication device directly without the conference server, whether to transmit the second proxy setting, stored in the storage device, to the other communication device based on the device information included in the setting request data; and a second transmitting operation transmitting directly without the conference server, in response to the determination by the fourth determining operation that the second proxy setting is to be transmitted to the other communication device, the second proxy setting to the other communication device.

5. The non-transitory computer-readable medium according to claim 4, wherein the fourth determining operation comprises determining whether the device information in the setting request data is included in the history information stored in the storage device, and wherein the second transmitting operation comprises transmitting, in response to the determination by the fourth determining operation that the device information is included in the history information, the second proxy setting to the other communication device.

6. The non-transitory computer-readable medium according to claim 4, wherein the history information includes number information indicating a number of conferences that were held with the other communication device identified by the device information in association with the device information, wherein the fourth determining operation comprises determining whether the number of conferences associated with the device information in the setting request data is greater than a predetermined number, and wherein the second transmitting operation comprises transmitting, in response to the determination by the fourth determining operation that the number of conferences associated with the device information is greater the predetermined number, the second proxy setting to the other communication device.

7. The non-transitory computer-readable medium according to claim 4, wherein the first transmitting operation comprises transmitting setting request data including conference information to the specific communication device, the conference information being information identifying a remote conference that is held in the session established with the conference server, the fourth determining operation comprises determining whether a remote conference identified by the conference information included in the setting request data is being held in the session established with the conference server, and the second transmitting operation comprises transmitting, in response to the determination by the fourth determining operation that the remote conference identified by the conference information is being held in the session established with the conference server, the second proxy setting to the other communication device.

8. The non-transitory computer-readable medium according to claim 4, wherein the computer-readable instructions, when executed by the processor, further perform processes comprising:

a third transmitting operation transmitting, to an authentication server that is provided outside the LAN, authentication request data that requests authentication of the other communication device identified by the device information included in the setting request data received from the other communication device, the authentication request data including the device information;

a first receiving operation receiving an authentication result from the authentication server in response to the third transmitting operation;

a fifth determining operation determining, in response to receiving of the authentication result from the authentication server, whether to transmit the second proxy setting to the other communication device, based on the authentication result; and a fourth transmitting operation transmitting, in response to the determination by the fifth determining operation to transmit the second proxy setting to the other communication device, the second proxy setting to the other communication device.

* * * * *